United States Patent
Abe

(10) Patent No.: US 8,395,489 B2
(45) Date of Patent: Mar. 12, 2013

(54) VEHICLE BURGLAR ALARM CIRCUIT

(75) Inventor: Yutaka Abe, Watarai-gun (JP)

(73) Assignee: Panasonic Corporation, Osaka (JP)

( * ) Notice: Subject to any disclaimer, the term of this patent is extended or adjusted under 35 U.S.C. 154(b) by 175 days.

(21) Appl. No.: 13/094,907

(22) Filed: Apr. 27, 2011

(65) Prior Publication Data

US 2011/0285520 A1 Nov. 24, 2011

(30) Foreign Application Priority Data

May 20, 2010 (JP) ................................. 2010-116672

(51) Int. Cl.
| | |
|---|---|
| B60R 25/10 | (2006.01) |
| G08B 23/00 | (2006.01) |
| G08B 26/00 | (2006.01) |
| G08B 1/00 | (2006.01) |
| G08B 21/00 | (2006.01) |
| G06K 7/08 | (2006.01) |
| G06F 1/00 | (2006.01) |
| H02H 3/00 | (2006.01) |
| G01R 31/08 | (2006.01) |
| G01C 9/00 | (2006.01) |

(52) U.S. Cl. ...................... 340/426.1; 340/517; 340/518; 340/533; 340/655; 235/449; 713/300; 361/2; 370/217; 370/252; 702/150

(58) Field of Classification Search ........................ None
See application file for complete search history.

(56) References Cited

U.S. PATENT DOCUMENTS

| | | | |
|---|---|---|---|
| 4,180,796 A | | 12/1979 | Palafox |
| 4,359,679 A | * | 11/1982 | Regan ............................ 323/272 |
| 4,947,312 A | * | 8/1990 | Tsuruoka et al. .............. 363/134 |
| 5,563,776 A | * | 10/1996 | Eck .................................. 363/26 |
| 5,604,669 A | * | 2/1997 | Strong, III ....................... 363/17 |
| 7,248,488 B2 | * | 7/2007 | Toda et al. ....................... 363/26 |
| 7,554,823 B2 | * | 6/2009 | Fukumoto et al. .............. 363/24 |
| 8,145,922 B2 | * | 3/2012 | Diab et al. ..................... 713/300 |
| 2003/0193821 A1 | * | 10/2003 | Krieger et al. .................. 363/25 |
| 2007/0008751 A1 | * | 1/2007 | Toda et al. ....................... 363/26 |
| 2008/0172564 A1 | * | 7/2008 | Diab et al. ..................... 713/300 |
| 2008/0229120 A1 | * | 9/2008 | Diab ............................. 713/300 |

(Continued)

FOREIGN PATENT DOCUMENTS

| | | |
|---|---|---|
| FR | 2865444 | 7/2005 |
| JP | 2005-215544 | 8/2005 |

OTHER PUBLICATIONS

European Search Report dated Sep. 7, 2011.

*Primary Examiner* — George Bugg
*Assistant Examiner* — Renee Dorsey
(74) *Attorney, Agent, or Firm* — Bacon & Thomas, PLLC

(57) ABSTRACT

A vehicle burglar alarm circuit includes a transformer including an input unit having taps and a center tap, and an output unit magnetically coupled to the input unit; a first and a second power source each having one electrode connected to the center tap to respectively output a higher voltage and a lower voltage; a driving unit including switching elements respectively having one ends connected to the taps and another ends respectively connected to the other electrodes of the power sources; a PWM controller outputting signals by which the switching elements are alternately turned on and off; and a power selecting unit for selecting one of the power sources. The PWM controller generates a first on-duty ratio when the first power source is selected and a second on-duty ratio when the second power source is selected such that the first on-duty ratio is smaller than the second on-duty ratio.

6 Claims, 4 Drawing Sheets

U.S. PATENT DOCUMENTS

| | | | |
|---|---|---|---|
| 2008/0250255 A1* | 10/2008 | Diab | 713/300 |
| 2009/0055662 A1* | 2/2009 | Diab | 713/300 |
| 2009/0107493 A1* | 4/2009 | Liu et al. | 128/202.22 |
| 2011/0221279 A1* | 9/2011 | Ratnaparkhi et al. | 307/151 |

* cited by examiner

VEHICLE BURGLAR ALARM CIRCUIT

FIELD OF THE INVENTION

The present invention relates to a vehicle burglar alarm circuit.

BACKGROUND OF THE INVENTION

With recent increase in the number of crimes such as car thefts, thefts from cars and the like, it has been widely popularized to install a burglar alarm device in a vehicle to sound an alarm by detecting abnormal conditions of the vehicle (e.g., the invasion of criminals on vehicles or the breakage of car windows) (see, e.g., Japanese Patent Application Publication No. 2005-215544).

A burglar, however, may turn off a vehicle burglar alarm device by separating a main battery from the alarm device. For that reason, there has been disclosed a vehicle burglar alarm device including a vehicle burglar alarm circuit capable of sounding an alarm by using an internal battery provided inside the alarm device, even when the main battery is separated from the alarm device.

FIG. 6 is a block diagram showing a conventional vehicle burglar alarm circuit provided in a vehicle burglar alarm device.

The conventional vehicle burglar alarm circuit includes a main battery 11, an internal battery 12, a DC/DC converter 13, a drive circuit unit 14 and a sounding body 15.

The main battery 11 includes a lead rechargeable battery for use in a vehicle. An output voltage V11 of the main battery 11 is a DC voltage of 12 V in the conventional vehicle burglar alarm circuit. The internal battery 12 includes a Ni-MH battery, a lithium battery or the like. An output voltage V12 of the internal battery 12 is a DC voltage ranging from 4.8 to 6.0 V in the conventional vehicle burglar alarm circuit. The DC/DC converter 13 employs as an input power source the main battery 11 when the main battery 11 is mounted on the alarm device and the internal battery 12 when the main battery 11 is separated therefrom. Further, there is provided a switch SW including a semiconductor device such as a field-effect transistor (FET), a transistor or the like for turning on and off a power supplied from the main battery 11 to the DC/DC converter 13.

The DC/DC converter 13 is of a flyback type and configured such that a boosting (step-up) ratio of an output voltage to an input voltage is variable. Further, the DC/DC converter 13 boosts the output voltage V11 and the output voltage V12 having different voltages at different ratios to output a constant output voltage V13. In the conventional vehicle burglar alarm circuit, the output voltage V13 of the DC/DC converter 13 is a DC voltage of 40 V.

The drive circuit 14 includes four transistors (not shown). Further, the drive circuit 14 generates a high frequency output voltage V14 from the output voltage V13 of a DC voltage by turning on and off the four transistors. In this conventional vehicle burglar alarm circuit, the output voltage V14 from the drive circuit 14 is a high frequency voltage of 80 Vpp.

The sounding body 15 is a siren including a ceramic oscillator. When the output voltage V14 is applied to the sounding body 15, the sounding body 15 produces an alarm sound.

With the above configuration, the conventional vehicle burglar alarm drive circuit can produce an alarm sound having the same sound pressure from the sounding body 15 regardless whether it is powered from the main battery 11 or the internal battery 12.

The conventional vehicle burglar alarm drive circuit generates and outputs the output voltage V13 having a predetermined value by varying a boosting ratio DC/DC converter 13. Accordingly, the DC/DC converter 13 requires a component for varying the boosting ratio, thereby complicating the circuit configuration.

Further, after the DC/DC converter 13 boosts the output voltage from the main battery 11 or the internal battery 12, the drive circuit 14 converts it into a high frequency voltage. For that reason, it is necessary to install both the DC/DC converter 13 and the drive circuit 14, thereby increasing the number of parts and the cost.

Accordingly, to simplify the circuit configuration, there has been disclosed a vehicle burglar alarm circuit which performs the conversion to a high frequency power by using a push-pull circuit and changes the boosting ratio of the transformer. The transformer of the vehicle burglar alarm circuit includes a tap switching unit for switching between a plurality of taps connected to a primary coil thereof. In the respective cases of being powered from the main battery and the internal battery, the boosting ratio can be varied by adjusting the coil ratio between the primary coil and the secondary coil connected to the sounding body as the taps of the first coil are switched by the tap switching unit. Accordingly, it is possible to sound the alarm having a satisfactory sound pressure level even when the sounding body is powered from the internal battery whose output voltage is lower than that of the main battery.

As such, the conventional vehicle burglar alarm circuit requires the transformer provided with the tap switching unit for varying the boosting ratio. Therefore, there have been demands for a vehicle burglar alarm circuit with a simpler circuit configuration.

SUMMARY OF THE INVENTION

In view of the above, the present invention provides a vehicle burglar alarm circuit with a simple circuit configuration capable of sounding an alarm having a satisfactory sound pressure level even when the vehicle burglar alarm circuit is powered from an internal battery provided therein.

In accordance with an aspect of the present invention, there is provided a vehicle burglar alarm circuit including a transformer including an input unit and an output unit, wherein the input unit includes a first tap, a second tap and a center tap, the center tap being connected to a center of a coil between the first tap and the second tap, and the output unit is magnetically coupled to the input unit, the output unit having output taps connected to a sounding body; a first power source, configured to be detachable and attachable, including one electrode connected to the center tap to output a first DC voltage; a second power source including one electrode connected to the center tap to output a second DC voltage that is lower than the first DC voltage; a sounding body driving unit including a first switching element having one end connected to the first tap and another end connected to the other electrode of the first power source, and a second switching element having one end connected to the second tap and another end connected to the other electrode of the second power source; a PWM controller for outputting driving signals by which the first switching element and the second switching element are alternately turned on and off and controlling on-duty ratios of the first switching element and the second switching element; and a power selecting unit for selecting one of the first and the second power source to supply a power to the transformer. The PWM controller generates a first on-duty ratio when the first power source is selected and a second on-duty ratio when the second power source is selected such that the first on-duty ratio is smaller than the second on-duty ratio.

Preferably, the transformer may have one coil to which the first tap, the second tap, the center tap and the output taps are connected.

Preferably, the transformer may have a primary coil to which the first tap, the second tap and the center tap are connected and a secondary coil to which the output taps are connected.

Preferably, a connection node at which the electrodes of the first and the second power source are connected may be connected to the center tap, and the circuit may further include a reverse current blocking unit provided between the connection node and the electrode of the second power source, for blocking a current flowing from the connection node toward the electrode of the second power source.

In accordance with the present invention, it is possible to provide a vehicle burglar alarm circuit with a simple circuit configuration capable of sounding an alarm having a satisfactory sound pressure level even when the vehicle burglar alarm circuit is powered from an internal battery provided therein.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
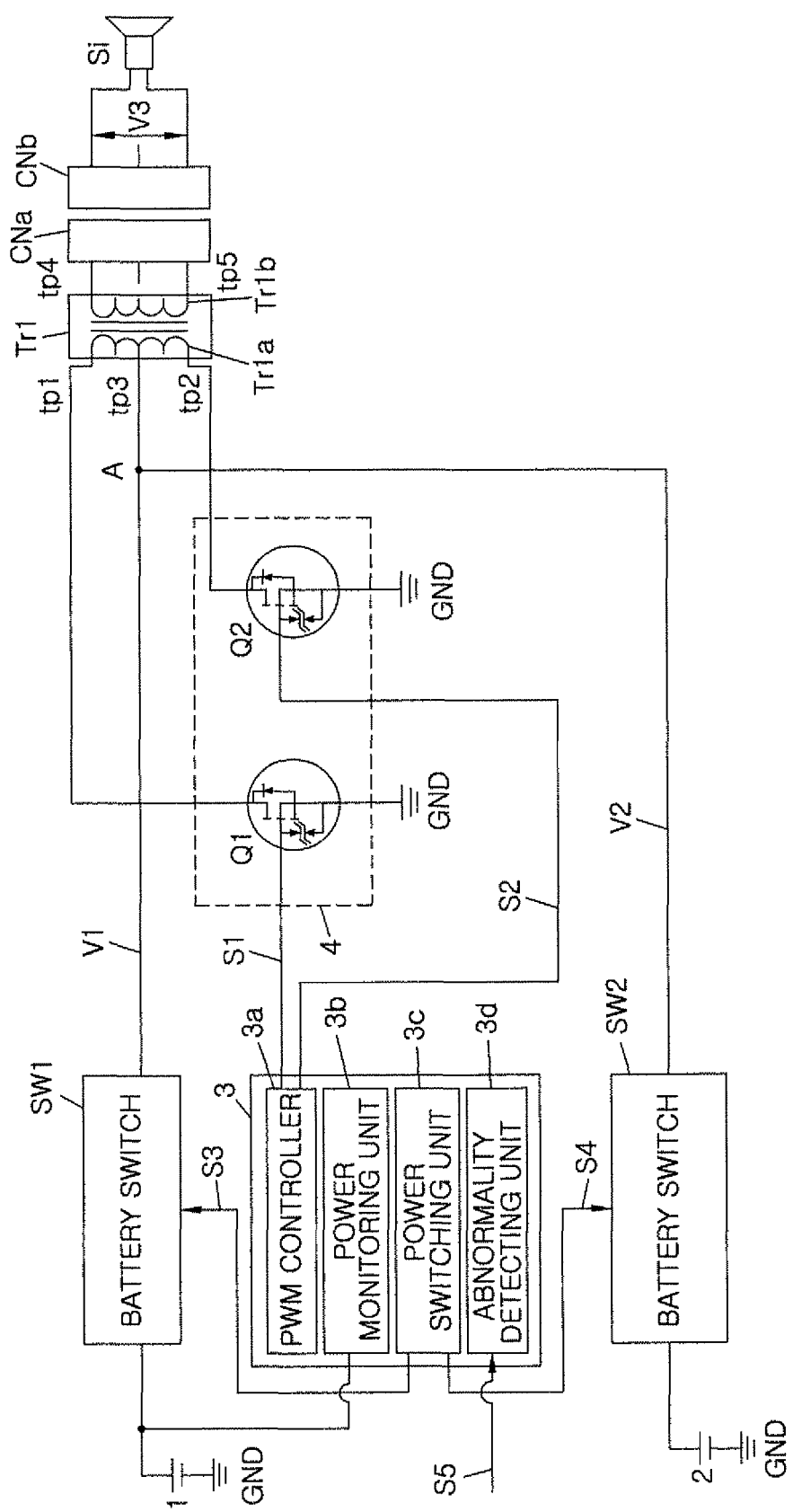
FIG. 1 is a schematic circuit configuration view showing a vehicle burglar alarm circuit in accordance with a first embodiment of the present invention.

Embodiments of the present invention will now be described with reference to the accompanying drawings which form a part hereof.

(First Embodiment)

In accordance with a first embodiment of the present invention, a vehicle burglar alarm circuit includes a main battery 1 configured to be detachable and attachable, an internal battery 2, a control unit 3, a sounding body driving unit 4, a transformer Tr1 and a siren (sounding body) Si.

The Transformer Tr1 includes a primary coil Tr1a (input unit) and a secondary coil Tr1b (output unit). A first and a second tap tp1 and tp2 are respectively connected to opposite ends of the primary coil Tr1a, and a center tap tp3 is connected to the center of primary coil Tr1a, the center tap tp3 being positioned between the taps tp1 and tp2. The first tap tp1 and the second tap tp2 are respectively connected to switching elements Q1 and Q2, and the center tap tp3 is connected to the main battery 1 and the internal battery 2.

The secondary coil Tr1b is magnetically connected to the primary coil Tp1a, and output taps tp4 and tp5 are respectively connected to opposite ends of the secondary coil Tr1b. Further, the output taps tp4 and tp5 are connected to a connector CNa.

A connector CNb is attachably mounted to be connected to the connector CNa, and the siren Si as a load is connected to the connector CNb. When the connectors CNa and CNb are coupled to each other, the secondary coil Tr1b of the transformer Tr1 makes electrical connection with the siren Si. In the present embodiment, the siren Si includes a ceramic piezoelectric plate, a dynamic speaker or the like.

Next, the sounding body driving unit 4 will be described. The sounding body driving unit 4 includes the switching elements Q1 and Q2, each of which contains, e.g., an N-channel MOFSET. The drain, source and gate of the switching element Q1 are respectively connected to the first tap tp1, a ground GND and a PWM controller 3a of the control unit 3. As a driving signal S1 in which a high level and a low level are alternately repeated is outputted from the PWM controller 3a to the gate of the switching element Q1, the switching element Q1 is alternately turned on and off.

The drain, source and gate of the switching element Q2 are respectively connected to the second tap tp2, a ground GND and the PWM controller 3a of the control unit 3. As a driving signal S2 in which a high level and a low level are alternately repeated is outputted from the PWM controller 3a to the gate of the switching element Q2, the switching element Q2 is alternately turned on and off. Further, a parasitic diode is connected between the drain and the source of each of the switching elements Q1 and Q2, and a gate protection diode is connected between the gate and the source of each of the switching elements Q1 and Q2.

Next, the main battery 1 and the internal battery 2 that are connected to the center tap tp3 of the primary coil Tr1a of the transformer Tr1 will be described. The main battery 1 serves as a first power source and includes a lead accumulator in use for a vehicle to output a DC voltage V1 of, e.g., 12 V. The positive electrode of the main battery 1 is connected to the center tap tp3 via a battery switch SW1, and the negative electrode thereof is connected to a ground GND. The battery switch SW1 is turned on and off depending on a power switching signal S3 outputted from a power switching unit 3c of the control unit 3 to control the power to be supplied from the main battery 1 to the transformer Tr1 and the power supply to be cut off.

The internal battery 2 serves as a second power source and includes a secondary battery containing, e.g., Ni-MH battery or a primary battery containing, e.g., a lithium battery to output a DC voltage V2 ranging from 4.8 to 6.0 V. The positive electrode of the internal battery 2 is connected to the center tap tp3 via a battery switch SW2, and the negative electrode thereof is connected to a ground GND. The battery switch SW2 is turned on and off depending on a power switching signal S4 outputted from the power switching unit 3c of the control unit 3 to control the power to be supplied from the internal battery 2 to the transformer Tr1 and the power supply to be cut off.

In the present embodiment, output lines of the battery switches SW1 and SW2 are connected to each other at a connection node A, which is connected to the center tap tp3. Accordingly, the DC voltage V1 or V2 is supplied from the main battery 1 or the internal voltage to the transformer Tr1.

Next, the control unit 3 will be described. The control unit 3 includes microcomputers serving as the PWM controller 3a, a power monitoring unit 3b, the power switching unit 3c, and an abnormality detecting unit and the like. For example, when detecting a vibration generated by the breakage of a car window or the like by, e.g., a burglar, a vibration sensor provided outside outputs a vibration detection signal S5 to the abnormality detecting unit 3d. Then, the abnormality detecting unit 3d determines whether or not the generated vibration is abnormal based on the vibration detection signal S5. If it is determined that the generated vibration is abnormal, the PWM controller 3a outputs the driving signals S1 and S2. Accordingly, the siren Si is driven to sound the alarm.

The power monitoring unit 3b, the power switching unit 3c, and the battery switches SW1 and SW2 constitute a power source selecting unit. Specifically, the power monitoring unit 3b monitors the DC voltage V1 supplied from the main battery 1, and one of the main battery 1 and the internal battery 2 is determined to supply the power to the transformer tr1 by turning on or off the battery switch SW1 or SW2 depending on a voltage level of the DC voltage V1.

Next, an operation of the vehicle burglar alarm circuit in accordance with the present embodiment will be described. The vehicle burglar alarm circuit in accordance with the present embodiment alternately turns on and off the switching element Q1 or Q2 to control the siren Si to sound the alarm, if the control unit 3 selects one of the main battery 1 and the internal battery 2 to drive the siren Si and it is determined that a vibration detected by the vibration sensor or the like is abnormal.

First, the case of selecting the main battery 1 to drive the siren Si will be described. The power monitoring unit 3b of the control unit 3 monitors the DC voltage V1 supplied from the main battery 1. If the DC voltage V1 is equal to or greater than a predetermined level, the power switching unit 3c outputs the power switching signal S3 for turning on the battery switch SW1 to turn on the battery switch SW1. Moreover, the power switching unit 3c outputs the power switching signal for turning off the battery switch SW2 to turn off the battery switch SW2. Accordingly, the power is supplied from the main battery 1 to the transformer Tr1.

Further, the abnormality detecting unit 3d performs the determination whether the vibration detection signal S5 from the vibration sensor indicates a normality or an abnormality. If it is determined by the abnormality detecting unit 3d that the vibration signal S5 indicates a normality, the PWM controller 3a outputs the driving signals S1 and S2 of low levels to turn off the switching elements Q1 and Q2 and, thus, the siren Si is not driven. on the other hand, if it is determined by the abnormality detecting unit 3d that the vibration signal S5 indicates an abnormality, the PWM controller 3a outputs the driving signals S1 and S2 in which high levels and low levels are alternately repeated to alternately turn on and off the switching elements Q1 and Q2 and, thus, the siren Si is driven to sound the alarm.

Figure 2:
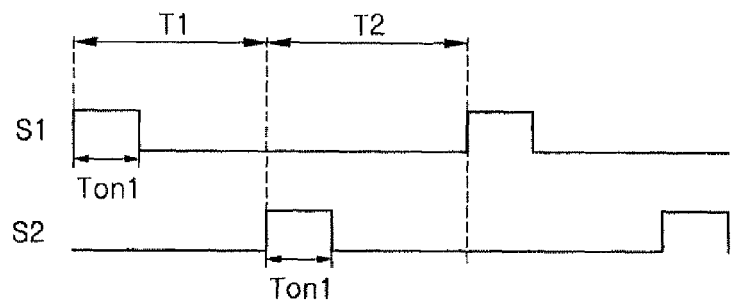
FIG. 2 is timing charts of driving signals in the case of being powered from a main battery in the vehicle burglar alarm circuit.

FIG. 2 is timing charts of the driving signals S1 and S2 in the case of being powered from the main battery 1. The driving signals S1 and S2 are formed of, e.g., square signals in which high levels and low levels are alternately repeated. Moreover, a potential on-period T1 during which the switching element Q1 can be turned on by outputting the driving signal S1 of high level and a potential on-period T2 during which the switching element Q2 can be turned on by outputting the driving signal S2 of high level are alternately repeated.

The PWM controller 3a performs the PWM (Pulse Width Modulation) for respectively modulating on-periods during which the switching elements Q1 and Q2 are turned on by outputting the driving signals S1 and S2 of high levels into the potential on-periods T1 and T2. In the present embodiment, the potential on-periods T1 and T2 of the driving signals S1 and S2 are set to be equal to each other. Accordingly, the potential on-periods T1 and T2 are referred to as "potential on-periods T0(=T1=T2)" hereinafter.

The PWM controller 3a controls on-duty ratios of the switching elements Q1 and Q2 by varying on-duty ratios D(=Ton/T0) of the driving signals S1 and S2 depending on which one of the main battery 1 and the internal battery 2 is selected to drive the siren Si. When the main battery 1 is selected, the PWM controller 3a controls the on-duty ratios to be set to D1(=Ton1/T0) by setting the on-periods of the driving signals S1 and S2 to Ton1.

With such configuration, the switching elements are alternately turned on and off, so that currents respectively alternately flow between the first tap tr1 and the center tap tr3 and between the second tap tr2 and the center tap tr3. Accordingly, an AC voltage V3 is supplied to the siren Si through the connectors CNa and CNb, to thereby sound the alarm.

Then, the case of selecting the internal battery 2 to drive the siren Si will be described. The power monitoring unit 3b of the control unit 3 monitors the DC voltage V1 supplied from the main battery 1. If the DC voltage V1 is lower than the predetermined level, the power switching unit 3c turns off the battery switch SW1 and turns on the battery switch SW2 to supply the power from the internal battery 2 to the transformer Tr1. The DC voltage V1 may be lower than the predetermined level, when the DC voltage V1 is decreased by ageing of the main battery 1, or the main battery 1 is electrically separated from the transformer Tr1, e.g., by detaching the main battery 1 from the vehicle burglar alarm device by a burglar.

In the present embodiment, the on-duty ratios D of the driving signals S1 and S2 are increased to sound the alarm having a satisfactory sound pressure, even when the siren Si is powered from the internal battery 2 which supplies DC voltage power that is smaller than that from the main battery 1. Accordingly, although the siren Si is powered from the internal battery 2, it is possible to supply to the transformer Tr1 the same power as that from the main battery 1.

Figure 3:
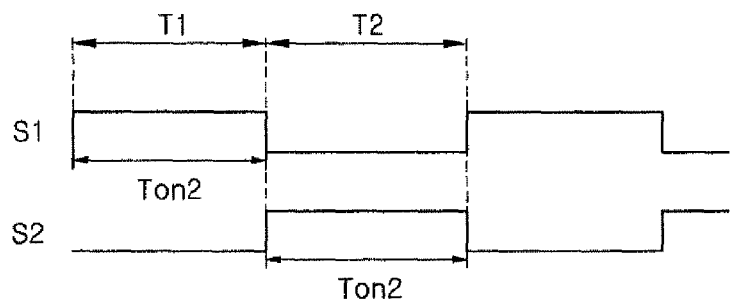
FIG. 3 is timing charts of the driving signals in the case of being powered from an internal battery in the vehicle burglar alarm circuit.

FIG. 3 is timing charts of the driving signals S1 and S2 in the case of being powered from the internal battery 2. When the siren Si is powered from the internal battery 2, the PWM controller 3a performs the PWM to set the on-periods of the driving signals S1 and S2 to Ton2. The on-periods in the case of being powered from the internal battery 2 are longer than those in the case of being powered from the main battery 1. In other words, on-duty ratios D2(=Ton2/T0) in the case of being powered from the internal battery 2 are greater than the on-duty ratios D1 in the case of being powered from the main battery 1. Accordingly, even when the siren Si is powered from the internal battery 2 which supplies DC voltage power that is smaller than that from the main battery 1, it is possible to accumulate the same amount of magnetic energy in the first coil Tr1a of the transformer Tr1 by extending the time period during which the power is supplied to the transformer Tr1 as compared with the case that the siren Si is powered from the main battery 1.

Figure 4:
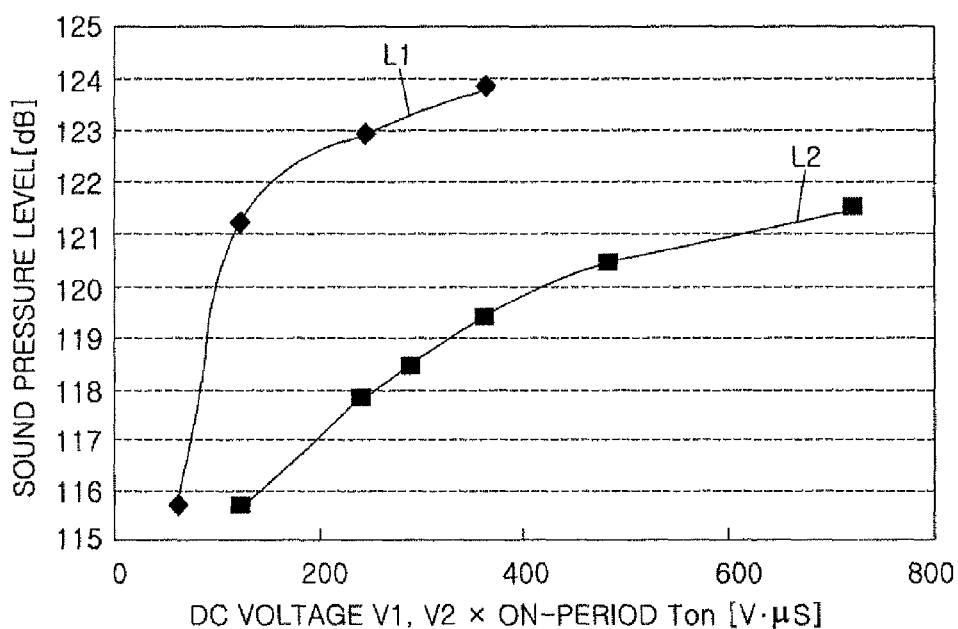
FIG. 4 is a plot view showing relationships between a sound pressure level of the alarm and values obtained by multiplying on-periods of driving signals by DC voltages.

FIG. 4 is a plot view showing relationships between a sound pressure level of the alarm and values obtained by multiplying the on-periods of the driving signals S1 and S2 by the DC voltages V1 and V2. In the present embodiment, the plot view shown in FIG. 4 depicts the variations of the sound pressure level of the alarm as the on-periods of the driving signals S1 and S2 are varied since the DC voltages V1 and V2 are hardly changed. In FIG. 4, a curve L1 shows a sound pressure variation trajectory of the alarm in the case of varying the on period Ton1 when the siren Si is powered from the main battery 1. A curve L2 shows a sound pressure variation trajectory of the alarm in the case of varying the on-period Ton2 when the siren Si is powered from the internal battery 2.

As shown in pressure variation trajectories L1 and L2, as the on-periods Ton are increased, the sound pressure level of the alarm is raised. In other words, by increasing the on-duty ratios D of the driving signals S1 and S2, the sound pressure level of the alarm generated from the siren Si becomes raised.

Accordingly, by setting the on-duty ratio D2 in the case of being powered from the internal battery 2 and the on-duty ratio D1 in the case of being powered from the main battery 1 such that the on-duty ratio D2 is greater than the on-duty ratio D1, it is possible to reduce the difference in the sound pressure levels of the alarms between the cases. In other words, by controlling the on-periods Ton1 and Ton2, it is possible to sound the alarm having substantially the same sound pressure in both of the cases.

Further, in the present embodiment, the power supplied to the transformer Tr1 is controlled by varying the on-duty ratios of the driving signals S1 and S2 and, thus, it is not required to provide a tap switching unit in the transformer unlike the conventional method. Accordingly, it is possible to simplify the circuit configuration and reduce the manufacturing cost.

In the transformer Tr1, the primary coil Tr1a and the secondary coil Tr1b are insulated from each other. Accordingly, even when the primary coil Tr1a of the transformer Tr1 is damaged by electrical surges or the like and, thus, a short-circuit current flows therein, this does not affect the secondary coil Tr1b since the primary coil Tr1a and the secondary coil Tr1b are insulated from each other.

In the meantime, when both of the battery switches SW1 and SW2 are turned on, a current may flow from the main battery 1 to the internal battery 2 since the output voltage of the main battery 1 is higher than that of the internal battery 2. However, in the present embodiment, there is provided a reverse current blocking unit for blocking the current flowing from the connection node A toward the internal battery 2. The reverse current blocking unit is embodied by employing a mechanical switch as the battery switch SW2 and turning off the battery switch SW2 while turning on the battery switch SW1 to prevent a current from flowing from the main battery 1 to the internal battery 2. Accordingly, it is possible to protect the internal battery 2 by suppressing a current flowing from the main battery 1 to the internal battery 2 when the siren Si is powered from the main battery 1. Alternatively, the reverse current blocking unit may be embodied as a diode connected in series to the battery switch SW2.

(Second Embodiment)

Figure 5:
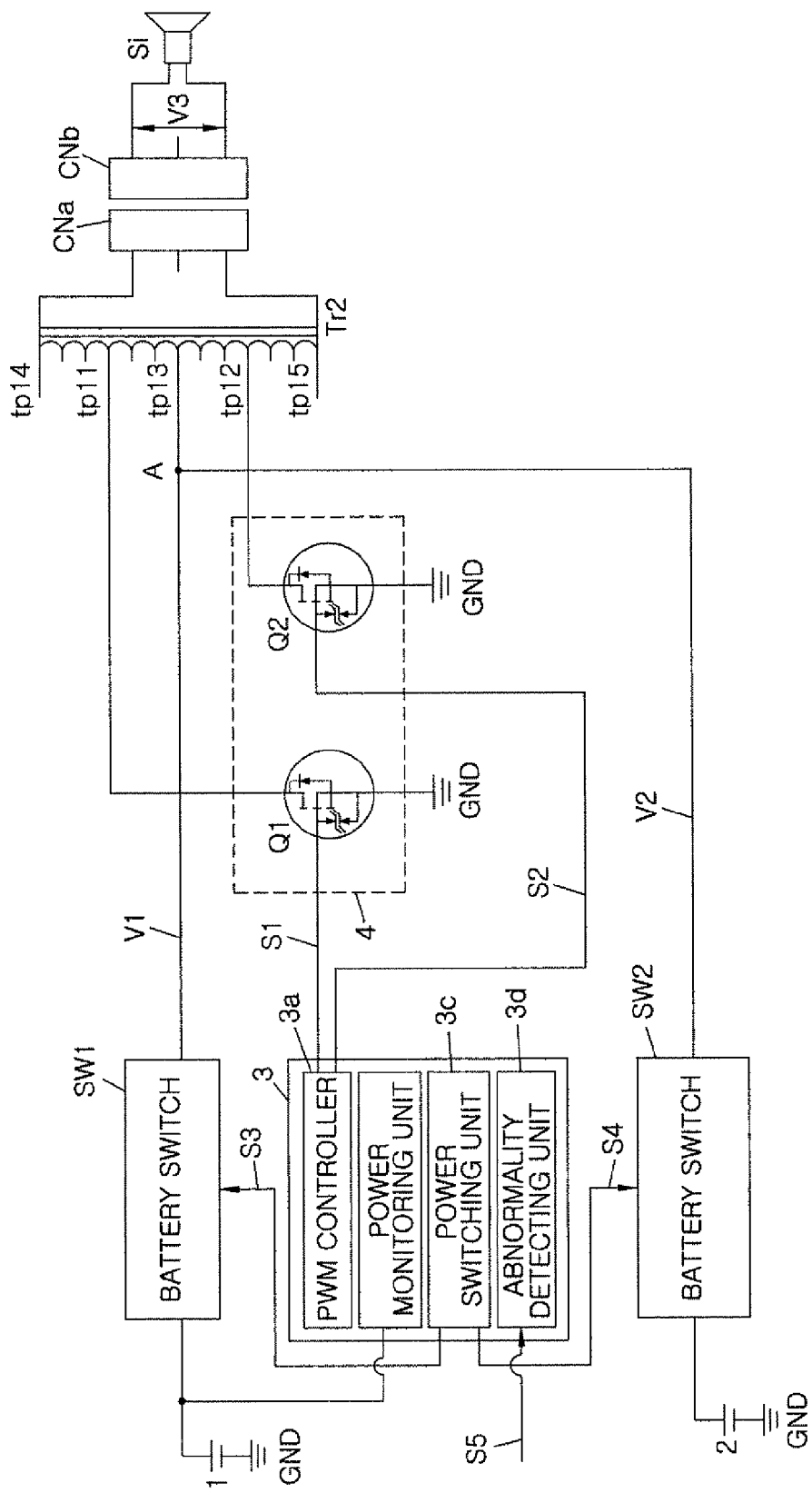
FIG. 5 is a schematic circuit configuration view showing a vehicle burglar alarm circuit including an autotransformer in accordance with a second embodiment of the present invention.
Figure 6:
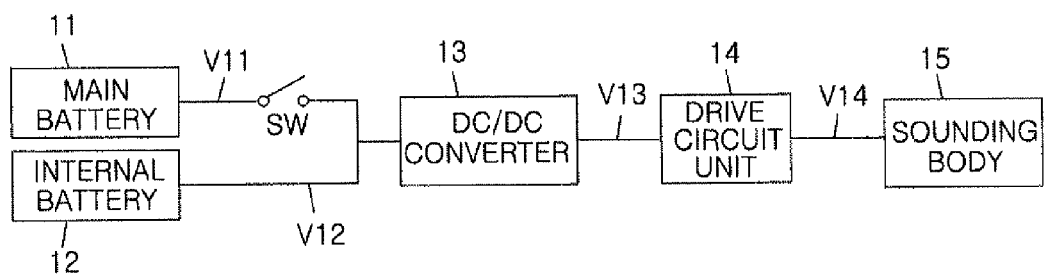
FIG. 6 is a block diagram showing a conventional vehicle burglar alarm circuit provided in a vehicle burglar alarm device.

A vehicle burglar alarm circuit including an autotransformer to drive the siren Si in accordance with a second embodiment of the present invention will be described. In the second embodiment, components having substantially the same function as those of the first embodiment are denoted by the same reference characters. FIG. 5 a schematic circuit configuration view showing the vehicle burglar alarm circuit including an autotransformer.

A transformer Tr2 includes an autotransformer, one coil of which has taps 11 to 15. A center tap tp13 is connected to the center of the coil, and output taps tp14 and tp15 are respectively connected to opposite ends of the coil. A first tap tp11 and a second tap tp12 are respectively connected to the coil at locations between taps tp13 and tp14, and between taps tp13 and tp15, respectively.

The first tap tp11 is connected to the drain of the switching element Q1, and the second tap tp12 is connected to the drain of the switching element Q2. The center tap tp13 is connected to the main battery 1 via the battery switch SW1 and the internal battery 2 via the battery switch SW2. Each of the output taps tp14 and tp15 is connected to the siren Si via the connectors CNa and CNb.

Other elements have the same configurations as those in the vehicle burglar alarm circuit of the first embodiment described with reference to FIG. 1 and, thus, redundant description thereof will be omitted herein.

With such configuration, by setting the on-duty ratio D1 of the driving signal S1 and S2 in the case of being powered from the main battery 1 and the on-duty ratio D2 of the driving signal S1 and S2 in the case of being powered from the internal battery 2 such that the on-duty ratio D1 is smaller than the on-duty ratio D2, it is possible to reduce the difference in the sound pressure levels of the alarms between the cases. In other words, by controlling the on-periods Ton1 and Ton2, it is possible to sound the alarm having substantially the same sound pressure in both of the cases.

Further, since the transformer Tr2 includes the autotransformer, a primary coil and a secondary coil are partially shared. Accordingly, it is possible to reduce the coil number of the transformer Tr2 and thus scale down the transformer Tr2.

While the invention has been shown and described with respect to the embodiments, it will be understood by those skilled in the art that various changes and modifications may be made without departing from the scope of the invention as defined in the following claims.

What is claimed is:

1. A vehicle burglar alarm circuit comprising:
    a transformer including an input unit and an output unit, wherein the input unit includes a first tap, a second tap and a center tap, the center tap being connected to a center of a coil between the first tap and the second tap, and the output unit is magnetically coupled to the input unit, the output unit having output taps connected to a sounding body;
    a first power source, configured to be detachable and attachable, including one electrode connected to the center tap to output a first DC voltage;
    a second power source including one electrode connected to the center tap to output a second DC voltage that is lower than the first DC voltage;
    a sounding body driving unit including a first switching element having one end connected to the first tap and another end connected to the other electrode of the first power source, and a second switching element having one end connected to the second tap and another end connected to the other electrode of the second power source;
    a PWM controller for outputting driving signals by which the first switching element and the second switching element are alternately turned on and off and controlling on-duty ratios of the first switching element and the second switching element; and
    a power selecting unit for selecting one of the first and the second power source to supply a power to the transformer,
    wherein the PWM controller generates a first on-duty ratio when the first power source is selected and a second on-duty ratio when the second power source is selected such that the first on-duty ratio is smaller than the second on-duty ratio.

2. The circuit of claim 1 wherein the transformer has one coil to which the first tap, the second tap and the center tap are connected.

3. The circuit of claim 1, wherein the transformer has a primary coil to which the first tap, the second tap, the center tap and the output taps are connected and a secondary coil to which the output taps are connected.

4. The circuit of claim 1, wherein a connection node at which said one electrodes of the first and the second power source are connected is connected to the center tap, and the circuit further comprises a reverse current blocking unit provided between the connection node and said one electrode of the second power source, for blocking a current flowing from the connection node toward said one electrode of the second power source.

5. The circuit of claim 2, wherein a connection node at which said one electrodes of the first and the second power source are connected is connected to the center tap, and the circuit further comprises a reverse current blocking unit provided between the connection node and said one electrode of the second power source, for blocking a current flowing from the connection node toward said one electrode of the second power source.

6. The circuit of claim 3, wherein a connection node at which said one electrodes of the first and the second power source are connected is connected to the center tap, and the circuit further comprises a reverse current blocking unit provided between the connection node and said one electrode of the second power source, for blocking a current flowing from the connection node toward said one electrode of the second power source.

* * * * *